United States Patent
Sasaki (10) Patent No.: US 12,506,423 B2
(45) Date of Patent: Dec. 23, 2025

(54) MOTOR DRIVE DEVICE HAVING OVERVOLTAGE PROTECTION CIRCUIT

(71) Applicant: FANUC CORPORATION, Yamanashi (JP)

(72) Inventor: Taku Sasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 156 days.

(21) Appl. No.: 18/291,288

(22) PCT Filed: Jul. 30, 2021

(86) PCT No.: PCT/JP2021/028495
§ 371 (c)(1),
(2) Date: Jan. 23, 2024

(87) PCT Pub. No.: WO2023/007747
PCT Pub. Date: Feb. 2, 2023

(65) Prior Publication Data
US 2024/0348183 A1    Oct. 17, 2024

(51) Int. Cl.
*H02P 3/18* (2006.01)
*H02H 7/08* (2006.01)
(Continued)

(52) U.S. Cl.
CPC ............ *H02P 3/18* (2013.01); *H02H 7/0805* (2013.01); *H02H 7/09* (2013.01); *H02P 23/14* (2013.01); *H02P 27/06* (2013.01)

(58) Field of Classification Search
CPC .. H02P 3/18; H02P 23/14; H02P 27/06; H02P 29/60; H02H 7/0805; H02H 7/09
See application file for complete search history.

(56) References Cited

U.S. PATENT DOCUMENTS

| 5,225,992 A * | 7/1993 | Kobari | ................... H02H 6/005 |
| | | | 702/58 |
| 7,518,837 B2 * | 4/2009 | Tseng | ...................... H02P 25/14 |
| | | | 361/29 |

(Continued)

FOREIGN PATENT DOCUMENTS

| JP | 2010200490 A | 9/2010 |
| JP | 2011062035 A | 3/2011 |

(Continued)

OTHER PUBLICATIONS

PCT International Search Report dated Sep. 28, 2021 for related International Application No. PCT/JP2021/028495, from which the instant application is based, 2 pgs.
English Abstract and Machine Translation for Japanese Publication No. JP 2010-200490 A, published Sep. 9, 2010, 29 pgs.
(Continued)

*Primary Examiner* — Thai T Dinh
(74) *Attorney, Agent, or Firm* — Fredrikson & Byron, P.A.

(57) ABSTRACT

This motor drive device comprises: a motor drive circuit that drives a synchronous motor by supplying AC power to the synchronous motor via power lines; an overvoltage protection circuit that short-circuits between the phases of the power lines by turning on a semiconductor switch when driving of the synchronous motor by the motor drive circuit is stopped and prevents the occurrence of overvoltage due to a back electromotive force between the terminals of the synchronous motor; and a temperature estimation unit that calculates a temperature estimation value of the semiconductor switch by using a motor constant and a semiconductor switch constant, said motor constant including at least one of the inertia and back electromotive force constants of the synchronous motor, said semiconductor switch constant including the on-resistance, thermal resistance, and thermal time constant of the semiconductor switch.

7 Claims, 6 Drawing Sheets

(51) Int. Cl.
*H02H 7/09* (2006.01)
*H02P 23/14* (2006.01)
*H02P 27/06* (2006.01)

(56) References Cited

U.S. PATENT DOCUMENTS

| | | | | |
|---|---|---|---|---|
| 7,602,594 | B2 * | 10/2009 | Yukitake | H02H 7/0833 |
| | | | | 361/33 |
| 10,090,795 | B2 * | 10/2018 | Tateda | H02P 29/032 |
| 10,498,265 | B2 * | 12/2019 | Aoki | H02P 29/0241 |

FOREIGN PATENT DOCUMENTS

| | | | |
|---|---|---|---|
| JP | 2012050332 A | 3/2012 |
| JP | 2017153327 A | 8/2017 |
| JP | 2017200337 A | 11/2017 |

OTHER PUBLICATIONS

English Abstract and Machine Translation for Japanese Publication No. JP 2012-050332 A, published Mar. 8, 2012, 30 pgs.
English Abstract and Machine Translation for Japanese Publication No. JP 2011-062035 A, published Mar. 24, 2011, 15 pgs.
English Abstract and Machine Translation for Japanese Publication No. JP 2017-200337 A, published Nov. 2, 2017, 28 pgs.
English Abstract and Machine Translation for Japanese Publication No. JP 2017-153327 A, published Aug. 31, 2017, 22 pgs.

* cited by examiner

MOTOR DRIVE DEVICE HAVING OVERVOLTAGE PROTECTION CIRCUIT

RELATED APPLICATIONS

This application is a 35 U.S.C. 371 national phase filing from International Application No. PCT/JP2021/028495, filed Jul. 30, 2021, the contents of which are incorporated herein by reference.

TECHNICAL FIELD

The present invention relates to a motor drive device including an overvoltage protection circuit.

BACKGROUND ART

In a motor drive device driving a synchronous motor, when the drive of the synchronous motor is stopped due to a cause such as an out-of-control state of the motor drive device, an emergency stop by the motor drive device, or the like, energy based on back electromotive force (back electromotive voltage) is generated in the synchronous motor. The energy generated in the synchronous motor is regenerated in an AC power supply or is regenerated in a regenerative load (regenerative resistor) provided in a DC link. However, when the size of the synchronous motor is large or when the synchronous motor rotates at a high speed, the energy based on the back electromotive force generated when the drive of the synchronous motor is stopped is very high, and overvoltage is generated in the motor drive device. Therefore, an overvoltage protection circuit (back electromotive voltage protection circuit) for protecting the motor drive device from back electromotive force generated when the synchronous motor is decelerated is provided.

For example, an overvoltage protection device including: a regenerative energy release means; a capacitor discharge means; a voltage detection means; and an overvoltage control means and suppressing overvoltage in a power conversion device including a power converter being connected to a capacitor connected to a DC power supply and driving a synchronous motor by converting power of the DC power supply into alternating current and supplying the converted power to an armature winding of the synchronous motor, wherein the voltage detection means detects voltage of an armature winding of the synchronous motor when the power converter stops, and the overvoltage control means decreases voltage of the armature winding by short-circuiting the armature winding and releasing rotation energy of the synchronous motor by controlling the regenerative energy release means when voltage of the armature winding exceeds a first predetermined value, cancels the short circuit of the armature winding by the regenerative energy release means when voltage of the armature winding decreases to a second predetermined value less than the first predetermined value, and discharges the capacitor by controlling the capacitor discharge means when voltage of the armature winding decreases to a third predetermined value less than the first predetermined value is known (for example, see PTL 1).

For example, a drive device for a permanent-magnet synchronous motor, the drive device including: an inverter inputting DC voltage of a DC power supply and outputting voltage to a permanent-magnet synchronous motor; a DC voltage detection means for detecting DC regenerative voltage appearing on an input side of the inverter; and an inverter control means for controlling voltage output by the inverter, wherein the inverter control means includes: short circuit means for controlling the inverter during regenerative operation in such a way as to short-circuit between the inverter and lines of the permanent-magnet synchronous motor, based on increasing regenerative voltage detected by the DC voltage detection means; an opening means for controlling the inverter in such a way as to open between the inverter and lines of the permanent-magnet synchronous motor, based on decreasing regenerative voltage detected by the DC voltage detection means; and an intermittent short circuit means for controlling the inverter in such a way as to alternately perform opening and short-circuiting between the inverter and lines of the permanent-magnet synchronous motor, based on increasing regenerative voltage detected by the DC voltage detection means, is known (for example, see PTL 2).

CITATION LIST

Patent Literature

[PTL 1] JP 2010-200490A
[PTL 2] JP 2012-050332A

SUMMARY OF INVENTION

Technical Problem

The overvoltage protection device prevents application of overvoltage to the motor drive device by short-circuiting between phases of a power line between the motor drive device and the synchronous motor when the drive of the synchronous motor is stopped and back electromotive force is generated. A semiconductor switch such as a thyristor is often used for a short circuit in the overvoltage protection device due to high operation speed. When the semiconductor switch is turned on and short-circuit current flows, the temperature of the semiconductor switch rises; and therefore, when the synchronous motor is redriven by the motor drive device, decrease in the temperature of the semiconductor switch needs to be awaited. Therefore, there is an issue that a temperature sensor for monitoring the semiconductor switch needs to be provided in the overvoltage protection device, which involves a cost. Further, when the temperature sensor fails, the temperature of the semiconductor switch cannot be monitored, and therefore, a suitable timing for redrive of the motor drive device cannot be recognized and efficient operation of the motor drive device is hindered, which may further lead to a failure of the overvoltage protection circuit. Accordingly, there is a need for a technology enabling low-cost and accurate recognition of the temperature of a semiconductor switch provided in an overvoltage protection circuit for protecting a motor drive device from back electromotive force generated when drive of a synchronous motor is stopped.

Solution to Problem

A motor drive device includes: a motor drive circuit configured to drive a synchronous motor by supplying AC power to the synchronous motor through a power line; an overvoltage protection circuit being provided between the synchronous motor and the motor drive circuit and, configured to short-circuit between phases of the power line by turning on a semiconductor switch when drive of the synchronous motor by the motor drive circuit is stopped to prevent generation of overvoltage due to back electromotive force between terminals of the synchronous motor; and a temperature estimation unit configured to calculate an estimated temperature value of the semiconductor switch that rises and then falls by turning on the semiconductor switch, by using a motor constant including at least one item out of inertia and a back electromotive force constant that are related to the synchronous motor, and semiconductor switch constants including on-resistance, thermal resistance, and a thermal time constant that are related to the semiconductor switch.

Advantageous Effects of Invention

According to an aspect of the present disclosure, the temperature of a semiconductor switch provided in an overvoltage protection circuit for protecting a motor drive device from back electromotive force generated when the drive of a synchronous motor is stopped can be accurately recognized at low cost.

DESCRIPTION OF EMBODIMENTS

A motor drive device including an overvoltage protection circuit will be described below with reference to drawings. In each drawing, similar members are given similar reference signs. In order to facilitate understanding, the drawings use different scales as appropriate. Illustrated configurations are examples for implementation, and the present disclosure is not limited to the configurations.

Figure 1:
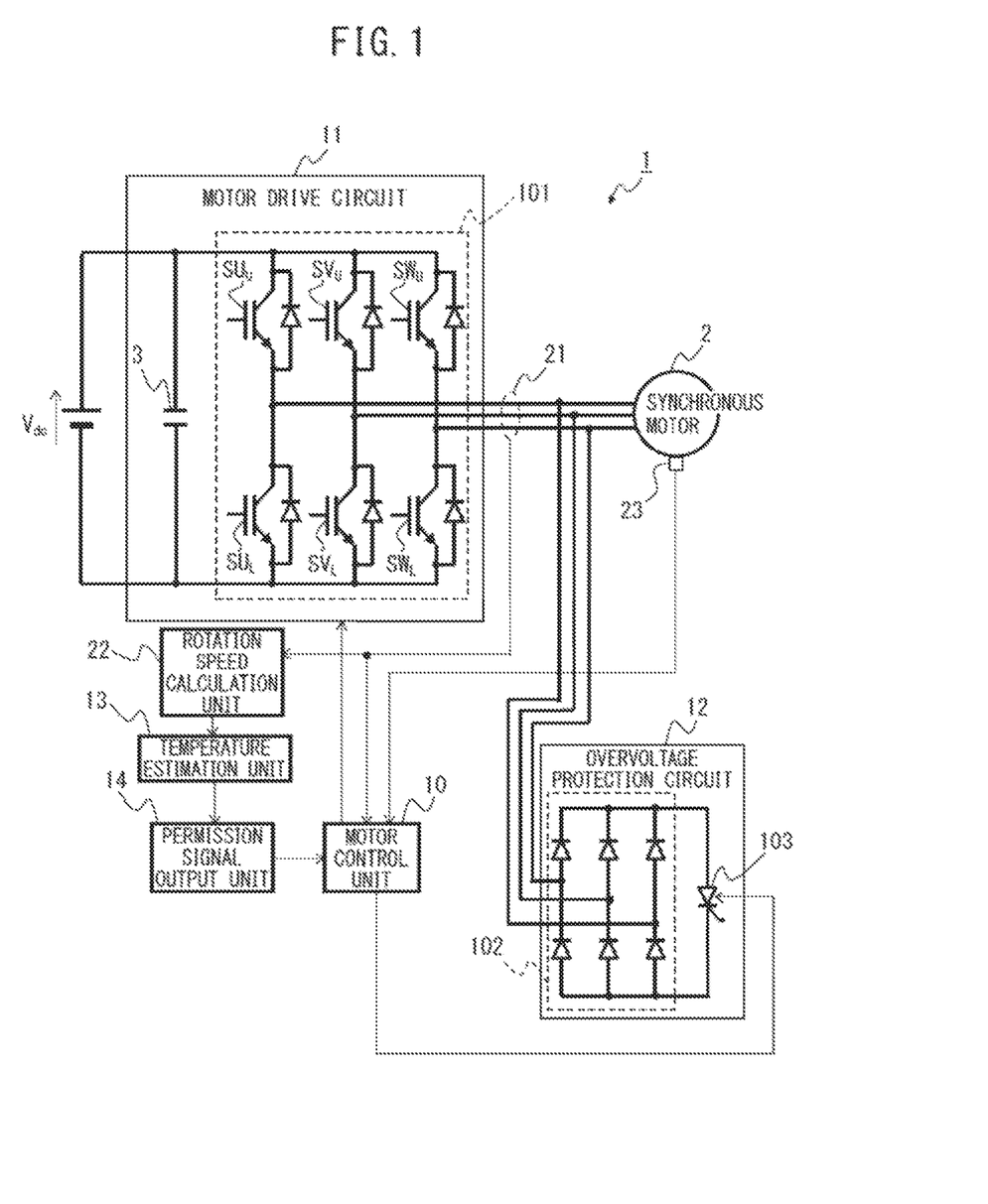
FIG. 1 is a diagram illustrating a motor drive device according to an embodiment of the present disclosure.

FIG. 1 is a diagram illustrating a motor drive device according to an embodiment of the present disclosure.

As an example, a case of driving a synchronous motor 2 by a motor drive device 1 will be described. It should be noted that the number of phases of the synchronous motor 2 according to the present embodiment does not particularly limit the present embodiment and may be, for example, three phases or a single phase. Examples of a machine provided with the synchronous motor 2 include a machine tool, a robot, a forging machine, an injection molding machine, and an industrial machine.

The motor drive device 1 according to the embodiment of the present disclosure includes a motor control unit 10, a motor drive circuit 11, an overvoltage protection circuit 12, a temperature estimation unit 13, a permission signal output unit 14, a current sensor 21, a rotation speed calculation unit 22, and a speed sensor 23.

The motor drive circuit 11 is connected to the synchronous motor 2 through a power line. The motor drive circuit 11 drives the synchronous motor 2 by supplying AC power to the synchronous motor 2 through the power line. Therefore, for example, the motor drive circuit 11 includes an inverter 101. The inverter 101 is composed of a switching element and a diode-based bridge circuit connected in antiparallel with the switching element. The inverter 101 is configured with a three-phase bridge circuit when the synchronous motor 2 is a three-phase motor and is configured with a single-phase bridge circuit when the synchronous motor 2 is a single-phase motor. Since the synchronous motor 2 is assumed to be a three-phase synchronous motor in the illustrated example, the inverter 101 is configured as a three-phase inverter. In the inverter 101, a U-phase upper arm is provided with a positive-side switching element $SU_U$, and a U-phase lower arm is provided with a negative-side switching element $SU_L$. A V-phase upper arm is provided with a positive-side switching element $SV_U$, and a V-phase lower arm is provided with a negative-side switching element $SV_L$. A W-phase upper arm is provided with a positive-side switching element $SW_U$, and a W-phase lower arm is provided with a negative-side switching element $SW_L$. For example, each switching element is on-off controlled in accordance with a PWM switching control method in the inverter 101. While examples of a switching element include a unipolar transistor such as an FET, a bipolar transistor, an IGBT, a thyristor, and a GTO, the type of switching element itself does not limit the present embodiment and may be another switching element.

A smoothing capacitor 3 and a DC power supply $V_{dc}$ are provided on a DC side of the inverter 101, and the inverter 101 converts DC power input from the DC power supply $V_{dc}$ into AC power by on-off control of the switching elements and supplies the converted power to the synchronous motor 2 through the power line. For example, the DC power supply $V_{dc}$ is configured with a rectifier circuit connected to an AC power supply or a battery accumulating DC power.

The motor control unit 10 on-off controls each switching element in the inverter 101 in the motor drive circuit 11. The motor control unit 10 controls a power conversion operation of the inverter 101, based on rotation speed (speed feedback) of the synchronous motor 2 detected by the speed sensor 23, current (current feedback) flowing through the power line detected by the current sensor 21, a predetermined torque command, an operation program of the synchronous motor 2, and the like. The speed, the torque, or the rotor position of the synchronous motor 2 is controlled based on AC power supplied from the inverter 101. It should be noted that the configuration of the motor control unit 10 described herein is strictly an example, and for example, the configuration of the motor control unit 10 may be defined including terms such as a position command generation unit, a position control unit, a speed control unit, a current control unit, and a torque command generation unit.

The power line connecting the synchronous motor 2 to the motor drive circuit 11 is connected to the overvoltage protection circuit 12. The overvoltage protection circuit 12 includes a semiconductor switch 103 and a diode rectifier circuit 102 including an AC terminal connected to the power line and a DC terminal connected to the semiconductor switch 103.

The diode rectifier circuit 102 in the overvoltage protection circuit 12 is a rectifier rectifying AC power based on back electromotive force of the synchronous motor 2 and outputting DC power. Since the synchronous motor 2 is assumed to be a three-phase motor in the illustrated example, the diode rectifier circuit 102 is configured with a three-phase full-bridge circuit; however, when the synchronous motor 2 is a single-phase motor, the diode rectifier circuit 102 is configured with a single-phase full-bridge circuit.

The semiconductor switch 103 in the overvoltage protection circuit 12 has a short circuit switching function of short-circuiting between terminals of the diode rectifier circuit 102 on a DC output side when being turned on and not short-circuiting between the terminals of the diode rectifier circuit 102 on the DC output side by being turned off. Examples of the semiconductor switch 103 include a thyristor, an IGBT, an FET, a GTO, and a transistor. For example, the on-off operation by the semiconductor switch 103 in the overvoltage protection circuit 12 may be controlled by the motor control unit 10, or a control unit (unillustrated) separate from the motor control unit 10 may be provided. When the drive of the synchronous motor 2 is stopped due to a cause such as an out-of-control state of the motor drive device 1 or an emergency stop by the motor drive device 1, the synchronous motor 2 decelerates, back electromotive force is generated, and high overvoltage is applied to the motor drive circuit 11. For example, when voltage exceeding withstanding voltage is applied to the smoothing capacitor 3 in the motor drive circuit 11, the smoothing capacitor 3 is damaged, and a fire may be caused in the worst case. Accordingly, when the drive of the synchronous motor 2 is stopped, a short circuit between the terminals of the diode rectifier circuit 102 on the DC output side is established by turning on the semiconductor switch 103 in the overvoltage protection circuit 12. For example, when the motor control unit 10 receives an alarm indicating that the motor drive device 1 has fallen into an out-of-control state, the motor control unit 10 commands the semiconductor switch 103 to turn on. Further, for example, when an emergency stop signal is input to the motor drive device 1, the motor control unit 10 commands the semiconductor switch 103 to turn on. Further, for example, when line voltage of the power line connecting the motor drive circuit 11 to the synchronous motor 2 exceeds a predetermined voltage, the motor control unit 10 detects the excess and commands the semiconductor switch 103 to turn on.

When being turned off, the semiconductor switch 103 does not short-circuit between the terminals of the diode rectifier circuit 102 on the DC output side, i.e., enters a state in which nothing is connected between the terminals of the diode rectifier circuit 102 on the DC output side. When being turned on, the semiconductor switch 103 short-circuits between the terminals of the diode rectifier circuit 102 on the DC output side. The diode rectifier circuit 102 executes an operation of rectifying AC power based on "back electromotive force of the synchronous motor 2" and outputting DC power only when the semiconductor switch 103 is turned on and a short circuit between the terminals of the diode rectifier circuit 102 on the DC output side is established. Since energy based on back electromotive force is entirely consumed through the diode rectifier circuit 102 and the semiconductor switch 103 in the overvoltage protection circuit 12, the motor drive device 1 can be protected from the back electromotive force. When the semiconductor switch 103 is turned on, the synchronous motor 2 gradually decelerates, and short-circuit current continuously flows through the semiconductor switch 103 until the synchronous motor 2 completely stops (i.e., until rotation energy of the synchronous motor 2 becomes zero); and therefore, the temperature of the semiconductor switch 103 rises. Subsequently, current does not flow through the semiconductor switch 103 in an on-state after the synchronous motor 2 stops, and therefore, the temperature gradually falls. When, before the temperature of the semiconductor switch 103 sufficiently falls, drive of the synchronous motor 2 by the motor drive device 1 is started, drive of the synchronous motor 2 by the motor drive device 1 is stopped again, and the semiconductor switch 103 in the overvoltage protection circuit 12 is turned on, heat is accumulated in the semiconductor switch 103, which may destroy the semiconductor switch 103. In order to avoid such destruction of the semiconductor switch 103, the motor drive device 1 according to the embodiment of the present disclosure estimates the temperature of the semiconductor switch 103 after the semiconductor switch 103 is turned on by calculation without using a temperature sensor, does not permit drive of the synchronous motor 2 to be started until the estimated temperature value becomes equal to or less than a predetermined temperature threshold value, and permits drive of the synchronous motor 2 to be started when the estimated temperature value becomes equal to or less than the predetermined temperature threshold value.

The temperature estimation unit 13 calculates an estimated temperature value of the semiconductor switch 103 by using motor constants including inertia and a back electromotive force constant that are related to the synchronous motor 2, and semiconductor switch constants including on-resistance, thermal resistance, and a thermal time constant that is related to the semiconductor switch 103. Details of calculation processing by the temperature estimation unit 13 will be described later. When the semiconductor switch 103 is turned on, the synchronous motor 2 gradually decelerates, and short-circuit current continuously flows through the semiconductor switch 103 until the synchronous motor 2 completely stops (i.e., until rotation energy of the synchronous motor 2 becomes zero); and the temperature of the semiconductor switch 103 rises. After the temperature of the semiconductor switch 103 rises to a maximum temperature, the temperature of the semiconductor switch 103 falls. According to the embodiment of the present disclosure, information about the temperature of the semiconductor switch 103 that rises and subsequently falls by turning on the semiconductor switch is not acquired by a temperature sensor but is acquired as an estimated value calculated by the temperature estimation unit 13.

When the falling estimated temperature value of the semiconductor switch 103 falls below a first temperature threshold value after the estimated temperature value of the semiconductor switch 103 reaches a maximum temperature, the permission signal output unit 14 outputs a signal permitting drive of the synchronous motor 2 to be started by the motor drive circuit 11 to the motor control unit 10.

Figure 2:
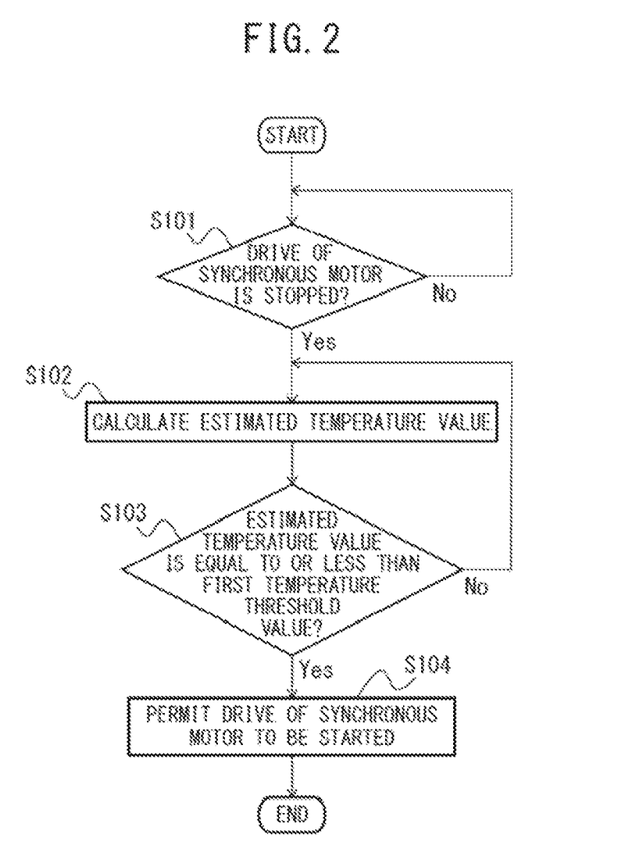
FIG. 2 is a flowchart illustrating an operation flow of the motor drive device according to the embodiment of the present disclosure.

FIG. 2 is a flowchart illustrating an operation flow of the motor drive device according to the embodiment of the present disclosure.

In a state of driving the synchronous motor 2 at a certain number of revolutions by the motor drive device 1, in step S101, the motor control unit 10 determines whether or not the drive of the synchronous motor 2 is stopped. When the drive of the synchronous motor 2 is stopped due to a cause such as an out-of-control state of the motor drive device 1 or an emergency stop by the motor drive device 1, the synchronous motor 2 decelerates, and back electromotive force is generated. For example, when the receiving an alarm indicating that the motor drive device 1 has fallen into an out-of-control state or when receiving an emergency stop signal to the motor drive device 1, the motor control unit 10 determines that the drive of the synchronous motor 2 is stopped. Alternatively, when the line voltage of the power line connecting the motor drive circuit 11 to the synchronous motor 2 exceeds a predetermined voltage, the motor control unit 10 may determine that the drive of the synchronous motor 2 is stopped. When determining that the drive of the synchronous motor 2 is stopped in step S101, the motor control unit 10 commands the semiconductor switch 103 in the overvoltage protection circuit 12 to turn on; and thus, a short circuit between the terminals of the diode rectifier circuit 102 on the DC output side is established and the processing advances to step S102.

In step S102, the temperature estimation unit 13 calculates an estimated temperature value of the semiconductor switch 103 by using the motor constants including inertia and a back electromotive force constant that are related to the synchronous motor 2, and the semiconductor switch constants including on-resistance, thermal resistance, and a thermal time constant that are related to the semiconductor switch 103. When the semiconductor switch 103 is turned on, the synchronous motor 2 gradually decelerates, and short-circuit current continuously flows through the semiconductor switch 103 until the synchronous motor 2 completely stops (i.e., until rotation energy of the synchronous motor 2 becomes zero); and the estimated temperature value of the semiconductor switch 103 calculated by the temperature estimation unit 13 rises. After the estimated temperature value of the semiconductor switch 103 reaches a maximum temperature, the estimated temperature value of the semiconductor switch 103 calculated by the temperature estimation unit 13 falls.

In step S103, the permission signal output unit 14 determines whether or not the falling estimated temperature value of the semiconductor switch 103 calculated by the temperature estimation unit 13 falls below the first temperature threshold value. Until the estimated temperature value rises to a maximum temperature, the processing in step S102 and step S103 is repeatedly executed, and calculation of the estimated temperature value by the temperature estimation unit 13 continues. Ater the estimated temperature value reaches the maximum temperature, the estimated temperature value gradually falls over time and falls below the first temperature threshold value at a certain point in time. At a point in time when the permission signal output unit 14 determines that the falling estimated temperature value of the semiconductor switch 103 calculated by the temperature estimation unit 13 falls below the first temperature threshold value, the processing advances to step S104. It should be noted that after the estimated temperature value reaches the maximum temperature, the temperature falls with a certain time constant, and therefore, the time required for the estimated temperature value to fall below the first temperature threshold value after reaching the maximum temperature can be predictively calculated. Accordingly, the temperature estimation unit 13 continuously executes calculation of the estimated temperature value in a period after the semiconductor switch 103 is turned on until the estimated temperature value rises to a maximum temperature and, after the estimated temperature reaches the maximum temperature, predictively calculates, as a "drive standby time," a time period with a point in time when the estimated temperature value reaches the maximum temperature as a starting point and a point in time when the estimated temperature value falls below the first temperature threshold value as an ending point; and the permission signal output unit 14 determines a point in time when the drive standby time elapses after the estimated temperature value reaches the maximum temperature to be a point in time when the falling estimated temperature value of the semiconductor switch 103 calculated by the temperature estimation unit 13 falls below the first temperature threshold value.

Thus, the temperature estimation unit 13 successively calculates an estimated temperature value after the semiconductor switch is turned on as drive of the synchronous motor 2 is stopped (step S101) until the estimated temperature value reaches the maximum temperature and, since the estimated temperature value exponentially decreases after reaching the maximum temperature, predictively calculates a "drive standby time" with a point in time when the estimated temperature value reaches the maximum temperature as a starting point and a point in time when the estimated temperature value falls below the first temperature threshold value as an ending point.

It should be noted that, for example, the first temperature threshold value has only to be approximately set to a value acquired by subtracting a maximum temperature rise by one operation of the overvoltage protection circuit 12 from the heat-resistant temperature of the semiconductor switch 103 and, for example, may be set with reference to a heat-resistant temperature defined in a specification table, an instruction manual, or the like of the semiconductor switch 103. The first temperature threshold value may preferably be set to a temperature lower than the heat-resistant temperature of the semiconductor switch 103 in such a way that the semiconductor switch 103 is not destroyed even when heat is accumulated by a flow of short-circuit current due to the semiconductor switch 103 being turned on a plurality of times in a short period. It should be noted that the first temperature threshold value may be stored in a rewritable storage unit (unillustrated) and be rewritable by external equipment, and the first temperature threshold value may be changed to a suitable value as needed even after once being set.

In step S104, the permission signal output unit 14 outputs a signal permitting drive of the synchronous motor 2 to be started by the motor drive circuit 11 to the motor control unit 10. Thus, the motor control unit 10 enters a standby state in such a way as to be able to restart drive control of the synchronous motor 2 any time. An operator preferably performs preparation work for redrive of the synchronous motor 2 such as, when the cause of the stop of drive of the synchronous motor 2 in step S101 is, for example, an out-of-control state of the motor drive device 1, performing work for removing the cause of the out-of-control state and when the cause of the stop of drive of the synchronous motor 2 is, for example, an emergency stop by the motor drive device 1, performing work for removing the cause of the emergency stop. After the overvoltage protection circuit 12 is started and the semiconductor switch 103 is turned on, the motor control unit 10 cannot perform drive control of the synchronous motor 2 unless the drive of the synchronous motor 2 by the motor drive circuit 11 is permitted to be started by the permission signal output unit 14 in step S104, and therefore, safety of the motor drive device 1 can be secured. Actual drive of the synchronous motor 2 is performed upon removal of the cause of the stop of drive of the synchronous motor 2 by the operator after drive of the synchronous motor 2 by the motor drive circuit 11 is permitted to start by the permission signal output unit 14 in step S104.

Next, details of the calculation processing by the temperature estimation unit 13 will be described.

Figure 3:
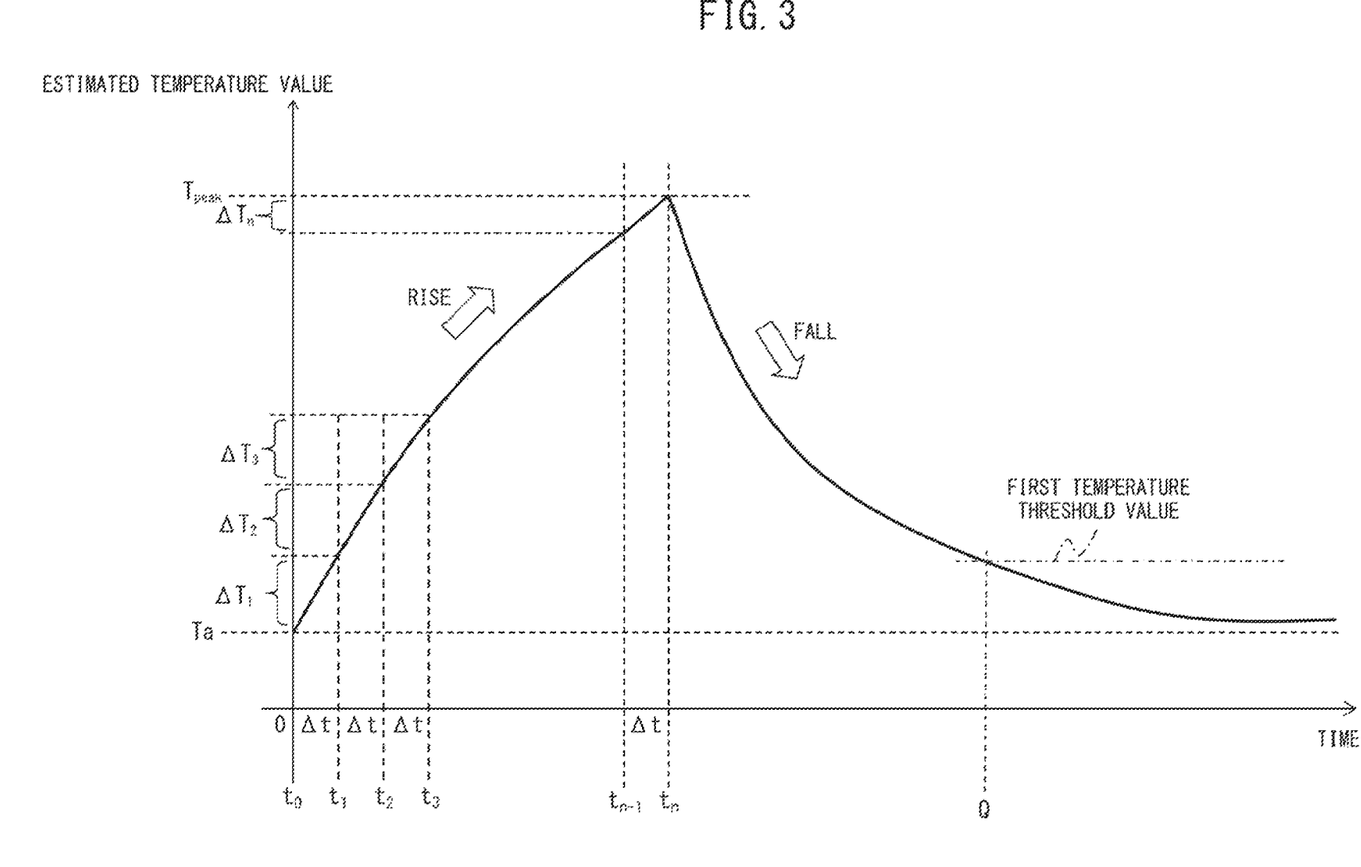
FIG. 3 is a diagram illustrating changes in estimated temperature of a semiconductor switch calculated by a temperature estimation unit in the motor drive device according to the embodiment of the present disclosure.

FIG. 3 is a diagram illustrating changes in estimated temperature of the semiconductor switch calculated by the temperature estimation unit in the motor drive device according to the embodiment of the present disclosure.

The temperature estimation unit 13 calculates an estimated temperature value of the semiconductor switch 103 by using the motor constants including inertia and a back electromotive force constant that are related to the synchronous motor 2, and the semiconductor switch constants including on-resistance, thermal resistance and a thermal time constant that are related to the semiconductor switch 103.

temperature estimation unit 13 calculates a rising estimated temperature value of the semiconductor switch 103 for each micro time $\Delta t$ [sec] as follows. Specifically, a time $t_0$ is set to be a time immediately after the semiconductor switch 103 is turned on, and a time period from a time $t_{i-1}$ to a time $t_i$ (where i is a natural number equal to or greater than 1) is set to a micro time $\Delta t$ [sec].

Parameters used for the following calculations are defined in Table 1.

TABLE 1

|  | time $t_0$ | micro time $\Delta t$ [sec] | time $t_1$ | ... time $t_i$ | micro time $\Delta t$ [sec] | time $t_{i+1}$ |
|---|---|---|---|---|---|---|
| Electric angular frequency of current fundamental wave | $F_{11}$ |  | — | — |  | — |
| Rotation speed of synchronous motor | $\omega_1$ |  | $\omega_2$ | $\omega_{i+1}$ |  | $\omega_{i+2}$ |
| Rotation energy of synchronous motor | $E_1$ |  | $E_2$ | $E_{i+1}$ |  | $E_{i+2}$ |
| Back electromotive force | $V_{bemf\_1}$ |  | $V_{bemf\_2}$ | $V_{bemf\_i+1}$ |  | $V_{bemf\_i+2}$ |
| Average value of DC voltage between terminals of semiconductor switch | $V_1$ |  | $V_2$ | $V_{i+1}$ |  | $V_{i+2}$ |
| Loss of semiconductor switch | $P_{t\_1}$ |  | $P_{t\_2}$ | $P_{t\_i+1}$ |  | $P_{t\_i+2}$ |
| Energy consumption of semiconductor switch |  | $\Delta E_1$ |  |  | $\Delta E_{i+1}$ |  |
| Temperature rise of semiconductor switch |  | $\Delta T_1$ |  |  | $\Delta T_{i+1}$ |  |

Out of the motor constants used for calculation of an estimated temperature value, the inertia (moment of inertia) related to the synchronous motor 2 is denoted by A [kgm²]. The inertia A [kgm²] includes the inertia of the synchronous motor 2 itself and the inertia of an object connected to the rotation axis of the synchronous motor 2. Further, a back electromotive force coefficient of the synchronous motor 2 is denoted by $V_k$ [V/(rad/sec)], and the number of poles of the synchronous motor 2 is denoted by N.

Out of the semiconductor switch constants used for calculation of an estimated temperature value, on-resistance related to the semiconductor switch 103 is denoted by $R_t$ [Ω], thermal resistance is denoted by B [° C./W], a thermal time constant during a temperature rise is denoted by $\tau_1$ [sec], and a thermal time constant during a temperature fall is denoted by $\tau_2$ [sec].

It should be noted that while the loss of a motor winding and the loss of the diode rectifier circuit 102 are omitted in the following description since the loss of the motor winding and the loss of the diode rectifier circuit 102 are sufficiently small compared with the loss of the semiconductor switch 103, an estimated temperature value may be calculated including the losses.

When the semiconductor switch 103 in the overvoltage protection circuit 12 is turned on and short-circuits the power line immediately after the drive of the synchronous motor 2 by the motor drive circuit 1 is stopped and the synchronous motor 2 enters a free-running state in a state of the motor drive device 1 driving the synchronous motor 2 at a certain number of revolutions, current flows through the semiconductor switch 103, and a temperature rise continues until the temperature reaches a maximum temperature. The The loss $P_{t\_1}$ [W] and energy consumption $\Delta E_1$ of the semiconductor switch 103 in the micro time $\Delta t$ [sec] from the time $t_0$ immediately after the semiconductor switch 103 is turned on to a time $t_1$ is found as follows.

The rotation speed $\omega_1$ [rad/sec] of the synchronous motor 2 at the time $t_0$ immediately after the semiconductor switch 103 is turned on can be found in accordance with Equation 1 by using an electric angular frequency $F_{f1}$ [rad/sec] of a fundamental wave of current detected by the current sensor 21 immediately before the semiconductor switch 103 is turned on and the number of poles N of the synchronous motor 2. It should be noted that since the current is not detected by the current sensor 21 after the semiconductor switch 103 is turned on, current detection by the current sensor 21 is always executed during normal operation of the motor drive device 1 in such a way that current immediately before the semiconductor switch 103 is turned on can be reliably detected.

[Math. 1]

$$\omega_1 = \frac{F_{f1}}{N/2} \qquad (1)$$

The rotation speed calculation unit 22 calculates the rotation speed $\omega_1$ [rad/sec] of the synchronous motor 2 at the time $t_0$ immediately after the semiconductor switch 103 is turned on in accordance with Equation 1, based on a value of current detected by the current sensor 21.

Rotation energy $E_1$ [J] at the time $t_0$ immediately after the semiconductor switch 103 is turned on can be found in accordance with Equation 2 by using the inertia A [kgm²] and the rotation speed $\omega_1$ [rad/sec] of the synchronous motor 2 at the time $t_0$.

[Math. 2]

$$E_1 = \frac{1}{2} \times A \times \omega_1^2 \qquad (2)$$

Back electromotive force $V_{bemf\_1}$ [V] at the time $t_0$ immediately after the semiconductor switch 103 is turned on can be found in accordance with Equation 3 by using the back electromotive force coefficient $V_k$ [V/(rad/sec)].

[Math. 3]

$$V_{bemf\_1} = V_k \times \omega_1 \qquad (3)$$

An effective value V [V], an angular frequency $\omega$ [rad/sec], and three-phase AC voltages $v_a$ [V], $v_b$ [V], and $v_c$ [V] are expressed as Equation 4.

[Math. 4]

$$\begin{aligned} v_a &= \sqrt{2}\, V\sin\omega t \\ v_b &= \sqrt{2}\, V\sin\left(\omega t - \frac{2}{3}\pi\right) \\ v_c &= \sqrt{2}\, V\sin\left(\omega t + \frac{2}{3}\pi\right) \end{aligned} \qquad (4)$$

The mean value $E_d$ [V] of DC voltage output from the diode rectifier circuit 102 with the three-phase AC voltages $v_a$[V], $v_b$ [V], and $v_c$ [V] expressed by Equation 4 as inputs is expressed as Equation 5.

[Math. 5]

$$\begin{aligned} E_d &= \frac{1}{2\pi} \times \int_0^{2\pi} e_d d\omega t \\ &= \frac{1}{2\pi} \times \Bigg[ \int_0^{\frac{\pi}{6}} (v_c - v_a) d\omega t + \int_{\frac{\pi}{6}}^{\frac{\pi}{2}} (v_a - v_b) d\omega t + \\ &\quad \int_{\frac{\pi}{2}}^{\frac{5\pi}{6}} (v_a - v_c) d\omega t + \int_{\frac{5\pi}{6}}^{\frac{7\pi}{6}} (v_b - v_c) d\omega t + \\ &\quad \int_{\frac{7\pi}{6}}^{\frac{3\pi}{2}} (v_b - v_a) d\omega t + \int_{\frac{3\pi}{2}}^{\frac{11\pi}{6}} (v_c - v_a) d\omega t + \int_{\frac{11\pi}{6}}^{2\pi} (v_b - v_a) d\omega t \Bigg] \end{aligned} \qquad (5)$$

Simplification of Equation 5 yields Equation 6.

[Math. 6]

$$E_d = \frac{3\sqrt{6}}{\pi} V \qquad (6)$$

The mean value $V_1$ [V] of DC voltage applied to both ends of the semiconductor switch 103 when the back electromotive force $V_{bemf\_1}$ [V] at the time $t_0$ immediately after the semiconductor switch 103 is turned on is generated is expressed as Equation 7 by using Equation 6.

[Math. 7]

$$V_1 = \frac{3\sqrt{6}}{\pi} V_{bemf\_1} \qquad (7)$$

The loss $P_{t\_1}$ [W] of the semiconductor switch 103 at the time $t_0$ immediately after the semiconductor switch 103 is turned on is expressed as Equation 8 by using the mean value $V_1$ [V] of DC voltage expressed by Equation 7.

[Math. 8]

$$P_{t\_1} = \frac{V_1^2}{R_t} \qquad (8)$$

The energy consumption $\Delta E_1$ [J] in the semiconductor switch 103 in the micro time $\Delta t$ [sec] from the time $t_0$ immediately after the semiconductor switch 103 is turned on is expressed as Equation 9 by using the loss $P_{t\_1}$ [W] of the semiconductor switch 103 in Equation 8.

[Math. 9]

$$\Delta E_1 = P_{t\_1} \times \Delta t \qquad (9)$$

Rotation energy $E_2$ [J] of the synchronous motor 2 in the next micro time $\Delta t$ [sec] starting at a time $t_1$ after an elapse of the micro time $\Delta t$ [sec] from the time $t_0$ is expressed as Equation 10.

[Math. 10]

$$E_2 = E_1 - \Delta E_1 \qquad (10)$$

A relational expression expressed by Equation 11 holds between the rotation speed $\omega_2$ [rad/sec] of the synchronous motor 2 and the rotation energy $E_2$ [J] of the synchronous motor 2 at the time $t_1$.

[Math. 11]

$$E_2 = \frac{1}{2} \times A \times \omega_2^2 \qquad (11)$$

From Equation 10 and Equation 11, the rotation speed $\omega_2$ [rad/sec] of the synchronous motor 2 at the time $t_1$ is found to be Equation 12.

[Math. 12]

$$\omega_2 = \sqrt{\frac{2E_1 - 2\Delta E_1}{A}} \qquad (12)$$

Processing similar to the above is executed for a time $t_2$ and beyond.

The parameters at each time $t_i$ is found as follows, based on Equation 1 to Equation 12.

The rotation speed $\omega_{i+1}$ [rad/sec] of the synchronous motor 2 at a time $t_i$ after the semiconductor switch 103 is turned on is expressed as Equation 13.

[Math. 13]

$$\omega_{i+1} = \sqrt{\frac{2E_{i+1} - 2\Delta E_i}{A}} \quad (13)$$

Back electromotive force $V_{bemf\_i+1}$ [V] at the time $t_i$ is expressed as Equation 14.

[Math. 14]

$$V_{bemf\_i+1} = V_k \times \omega_{i+1} \quad (14)$$

The mean value $V_{i+1}$ [V] of DC voltage applied to both ends of the semiconductor switch 103 when the back electromotive force $V_{bemf\_i+1}$ [V] at the time $t_i$ is generated is expressed as Equation 15.

[Math. 15]

$$V_{i+1} = \frac{3\sqrt{6}}{\pi} V_{bemf\_i+1} \quad (15)$$

The loss $P_{t\_i+1}$ [W] of the semiconductor switch 103 at the time $t_i$ is expressed as Equation 16.

[Math. 16]

$$P_{t\_i+1} = \frac{V_{i+1}^2}{R_t} \quad (16)$$

Energy consumption $\Delta E_{i+1}$ [J] in the micro time $\Delta t$ [sec] from the time $t_i$ is found as Equation 17.

[Math. 17]

$$\Delta E_{i+1} = P_{t\_i+1} \times \Delta t \quad (17)$$

Rotation energy $E_{i+2}$ [J] of the synchronous motor 2 in the micro time $\Delta t$ [sec] from a time $t_{i+1}$ is found as Equation 18.

[Math. 18]

$$E_{i+1} = E_{i+1} - \Delta E_{i+1} \quad (18)$$

A temperature rise $\Delta T_{i+1}$ [° C.] of the semiconductor switch 103 in the micro time $\Delta t$ [sec] from the time $t_i$ is expressed as Equation 19 by using the loss $P_{t\_1+1}$ [W] and the thermal resistance B [° C./W] of the semiconductor switch 103.

[Math. 19]

$$\Delta T_{i+1} = P_{t\_i+1} \times B \times \left(1 - e^{-\frac{\Delta t}{\tau_1}}\right) \quad (19)$$

The semiconductor switch 103 reaches a maximum temperature $T_{peak}$ [° C.] at a point in time when the synchronous motor 2 stops. The time P [sec] required for the synchronous motor 2 to stop (i.e., the rotation speed $\omega_i$ [rad/sec] of the synchronous motor 2 to become 0 or the rotation speed $\omega_i$ [rad/sec] of the synchronous motor 2 to become equal to or less than a certain micro threshold value) can be found by solving the recurrence formulae described above. Assuming that the synchronous motor 2 stops at a time $t_n$, the maximum temperature $T_{peak}$ [° C.] of the semiconductor switch 103 reached at the time $t_n$ after the semiconductor switch 103 is turned on is expressed by Equation 20. The ambient temperature of the motor drive device 1 or the overvoltage protection circuit 12 is assumed to be Ta [° C.]. A predetermined constant value may be used as the ambient temperature Ta [° C.] assuming the temperature around the motor drive device 1 or the overvoltage protection circuit 12 to be a constant temperature, or a temperature measured by a temperature sensor installed close to the motor drive device 1 or the overvoltage protection circuit 12 may be used.

[Math. 20]

$$T_{peak} = T_a + \sum_{i=1}^{n} \Delta T_i = T_a + B \times \left(1 - e^{-\frac{\Delta t}{\tau_1}}\right) \times \sum_{i=1}^{n} P_{t\_i} \quad (20)$$

After the synchronous motor 2 stops and the temperature of the semiconductor switch 103 reaches the maximum temperature $T_{peak}$ [° C.], the temperature of the semiconductor switch 103 falls exponentially with the thermal time constant of $\tau_2$ [sec], and the falling temperature of the semiconductor switch 103 falls below a first temperature threshold value $T_{th}$ at a time Q. A drive standby time $t_Q$ [sec] being a time period defined with the time $t_n$ when the synchronous motor 2 stops and the temperature of the semiconductor switch 103 reaches the maximum temperature $T_{peak}$ [° C.] as a starting point and the time Q when the temperature of the semiconductor switch 103 falls below the first temperature threshold value $T_{th}$ as an ending point can be found by solving Equation 21.

[Math. 21]

$$T_{th} = T_a + (T_{peak} - T_a) \times e^{-\frac{t_Q}{\tau_2}} \quad (21)$$

It should be noted that it is assumed in calculation of energy consumption $\Delta E_i$ [J] and a temperature rise $\Delta T_i$ [° C.] in the micro time $\Delta t$ [sec] from the aforementioned time $t_{i-1}$ that the rotation speed $\omega_i$ [rad/sec] of the synchronous motor 2, the rotation energy $E_i$ [J] of the synchronous motor 2, the back electromotive force $V_{bemf\_i}$ [V], the mean value $V_i$ [V] of DC voltage between both ends of the semiconductor switch 103, and the loss $P_{t\_i}$ [W] of the semiconductor switch are constant in the micro time $\Delta t$ [sec]. While the micro time $\Delta$[sec] is set to, for example, 1 millisecond, another value may be set. Since it generally takes several seconds to several tens of seconds for the synchronous motor 2 to stop, even when the rotation speed $\omega_i$ [rad/sec] of the synchronous motor 2, the rotation energy $E_i$ [J] of the synchronous motor 2, the back electromotive force $V_{bemf\_i}$ [V], the mean value $V_i$ [V] of DC voltage between both ends of the semiconductor switch 103, and the loss $P_{t\_1}$ [W] of the semiconductor switch are assumed to be constant in the micro time $\Delta t$ [sec] set to, for example, 1 millisecond, errors in the calculated energy consumption $\Delta E_i$ [J] and the calculated temperature rise $\Delta T_i$ [° C.] in the micro time $\Delta t$ [sec] are of negligible magnitude.

The temperature estimation unit 13 calculates an estimated temperature value of the semiconductor switch 103, based on the equations described above, by using motor constants including the inertia A [kgm$^2$] and the back electromotive force constant $V_k$ [V/(rad/sec)] that are related to the synchronous motor 2, a semiconductor switch constant including the on-resistance $R_t$ [Ω], the thermal resistance B [° C./W], the thermal time constant $\tau_1$ [sec] when the temperature rises, and the thermal time constant 2 [sec] when the temperature falls that are related to the semiconductor switch 103, and the rotation speed $\omega_t$ [rad/sec] of the synchronous motor 2 detected by the rotation speed calculation unit 22. The temperature estimation unit 13 calculates an estimated temperature value of the semiconductor switch 103 in accordance with Equation 13 to Equation 20 in a period after the semiconductor switch 103 is turned on until the semiconductor switch 103 reaches the maximum temperature $T_{peak}$ [° C.] and calculates the time $t_Q$ [sec] required to elapse after the time $t_n$ when the estimated temperature value reaches the maximum temperature $T_{peak}$ [° C.] before the time Q when the temperature of the semiconductor switch 103 falls below the first temperature threshold value $T_{th}$ in accordance with Equation 21 after the estimated temperature value reaches the maximum temperature $T_{peak}$ [° C.]. After calculating the maximum temperature $T_{peak}$ [° C.] of the semiconductor switch 103, the temperature estimation unit 13 calculates the drive standby time $t_Q$ [sec] required to elapse after the time $t_n$ when the estimated temperature value of the semiconductor switch 103 reaches the maximum temperature $T_{peak}$ [° C.] before the time Q when the temperature of the semiconductor switch 103 falls below the first temperature threshold value $T_{th}$. The permission signal output unit 14 determines a point in time after the elapse of the drive standby time $t_Q$ [sec] from the time $t_n$ when the estimated temperature value of the semiconductor switch 103 calculated by the temperature estimation unit 13 reaches the maximum temperature $T_{peak}$ [° C.] to be a point in time when the estimated temperature value of the semiconductor switch 103 falls below the first temperature threshold value and outputs a signal permitting drive of the synchronous motor 2 to be started by the motor drive circuit 11 to the motor control unit 10.

Next, several modified examples according to the embodiment of the present disclosure will be described.

Figure 4:
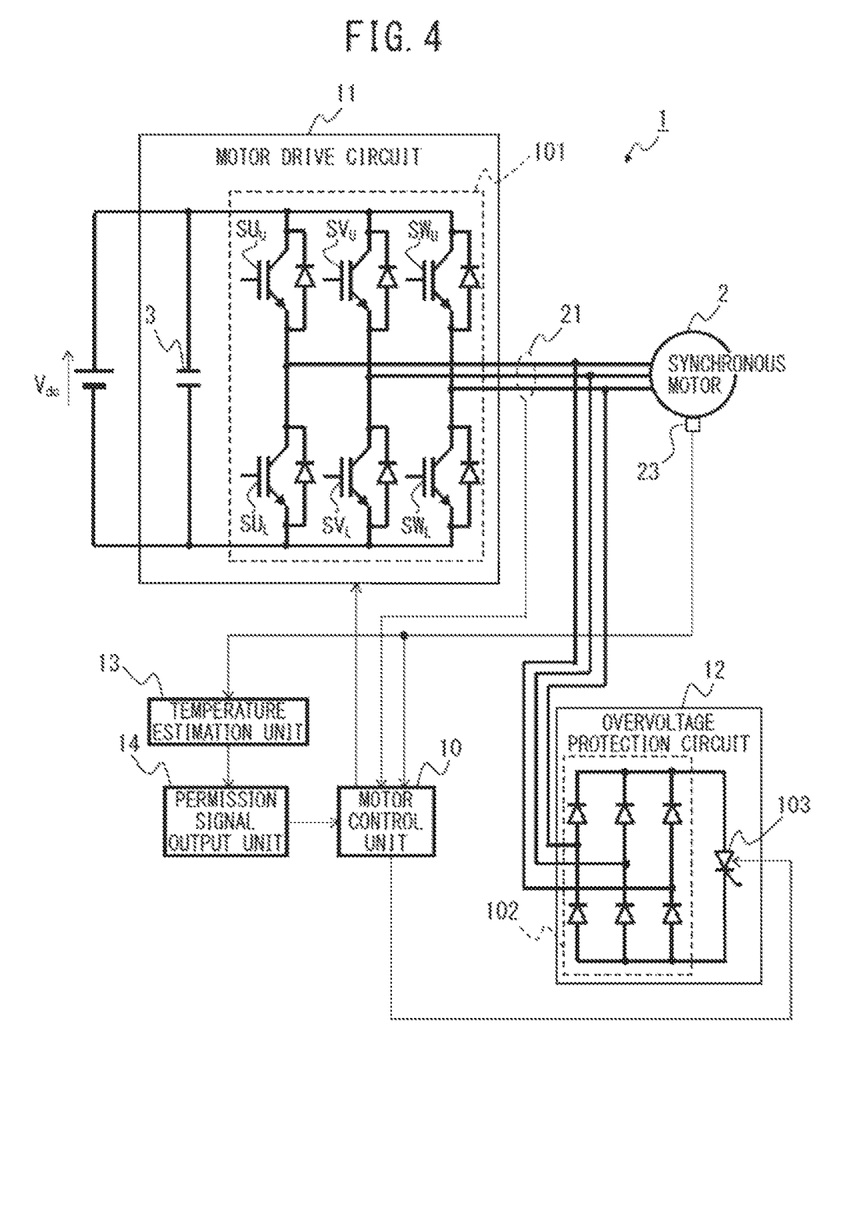
FIG. 4 is a diagram illustrating a first modified example of the motor drive device according to the embodiment of the present disclosure.

A first modified example according to the embodiment of the present disclosure uses a value detected by the speed sensor 23 attached to the synchronous motor 2 as the rotation speed of the synchronous motor 2 in the micro time Δt [sec] used in calculation of an estimated temperature value by the temperature estimation unit 13 instead of a value calculated based on a value of current detected by the current sensor 21. FIG. 4 is a diagram illustrating the first modified example of the motor drive device according to the embodiment of the present disclosure. In the first modified example, the rotation speed mi [rad/sec] of the synchronous motor 2 in the micro time Δt [sec] is detected by the speed sensor 23 attached to the synchronous motor 2. Thus, calculation based on Equation 1 by the rotation speed calculation unit 22 illustrated in FIG. 1 and calculation based on Equation 12 and Equation 13 by the temperature estimation unit 13 can be omitted, which lightens the calculation load.

A second modified example according to the embodiment of the present disclosure sets a rated number of revolutions $\omega_{rate}$ [rad/sec] of the synchronous motor 2 as the rotation speed of the synchronous motor 2 at the time $t_0$ immediately after the semiconductor switch 103 is turned on, the rotation speed being used in calculation of an estimated temperature value by the temperature estimation unit 13. The second modified example is particularly effective in an operation in which the synchronous motor 2 is always driven at the rated number of revolutions $\omega_{rate}$ [rad/sec]. The second modified example sets the rated number of revolutions $\omega_{rate}$ [rad/sec] as the rotation speed of the synchronous motor 2 at the time $t_0$ immediately after the semiconductor switch 103 is turned on; and therefore, calculation based on Equation 1 by the rotation speed calculation unit 22 illustrated in FIG. 1 and calculation based on Equation 12 and Equation 13 by the temperature estimation unit 13 can be omitted, which lightens the calculation load.

A third modified example according to the embodiment of the present disclosure previously generates a table indicating a relation between the rotation speed of the synchronous motor 2 at the time $t_0$ immediately after the semiconductor switch 103 is turned on and the time elapsed after the semiconductor switch 103 is turned on before the temperature of the semiconductor switch 103 becomes equal to or less than the first temperature threshold value. Since the rotation speed of the synchronous motor 2 at the time $t_0$ immediately after the semiconductor switch 103 is turned on is related to a maximum temperature that can be reached by the synchronous motor 2 on a one-to-one basis, the rotation speed of the synchronous motor 2 at the time $t_0$ immediately after the semiconductor switch 103 is turned on is related to the time elapsed after the semiconductor switch 103 is turned on before the temperature of the semiconductor switch 103 becomes equal to or less than the first temperature threshold value on a one-to-one basis. Therefore, the rotation speed of the synchronous motor 2 at the time $t_0$ immediately after the semiconductor switch 103 is turned on is acquired by calculation by the rotation speed calculation unit 22 or measurement by the speed sensor 23, and "the time elapsed after the semiconductor switch 103 turned on before the temperature of the semiconductor switch 103 becomes first temperature threshold value" related to the acquired rotation speed of the synchronous motor 2 is read from the table. The third modified example eliminates the need for execution of complex calculation for each operation of the overvoltage protection circuit 12, which lightens the calculation load.

A fourth modified example according to the embodiment of the present disclosure lightens the calculation load by assuming that the loss $P_{t\_1}$ [W] of the semiconductor switch 103 at the time $t_0$ immediately after the semiconductor switch 103 is turned on indicated by Equation 8 is constant until the synchronous motor 2 stops. Since the rotation speed of the synchronous motor 2 is maximum at the time $t_0$ immediately after the semiconductor switch 103 is turned on, short-circuit current flowing through the semiconductor switch 103 is maximum, and therefore, the loss of the semiconductor switch 103 is also maximum at that point in time. Accordingly, while use of the loss $P_{t\_1}$ [W] of the semiconductor switch 103 at the time $t_0$ immediately after the semiconductor switch 103 is turned on in calculation related to a subsequent micro time Δt [sec] may cause an estimated temperature value of the semiconductor switch 103 to be higher than the actual temperature, there is an advantage that the calculation load can be lightened.

A fifth modified example according to the embodiment of the present disclosure provides a further return current route of short-circuit current in preparation for a case of short-circuit current generated during operation of the overvoltage protection circuit 12 continuing to flow longer than expected.

Figure 5:
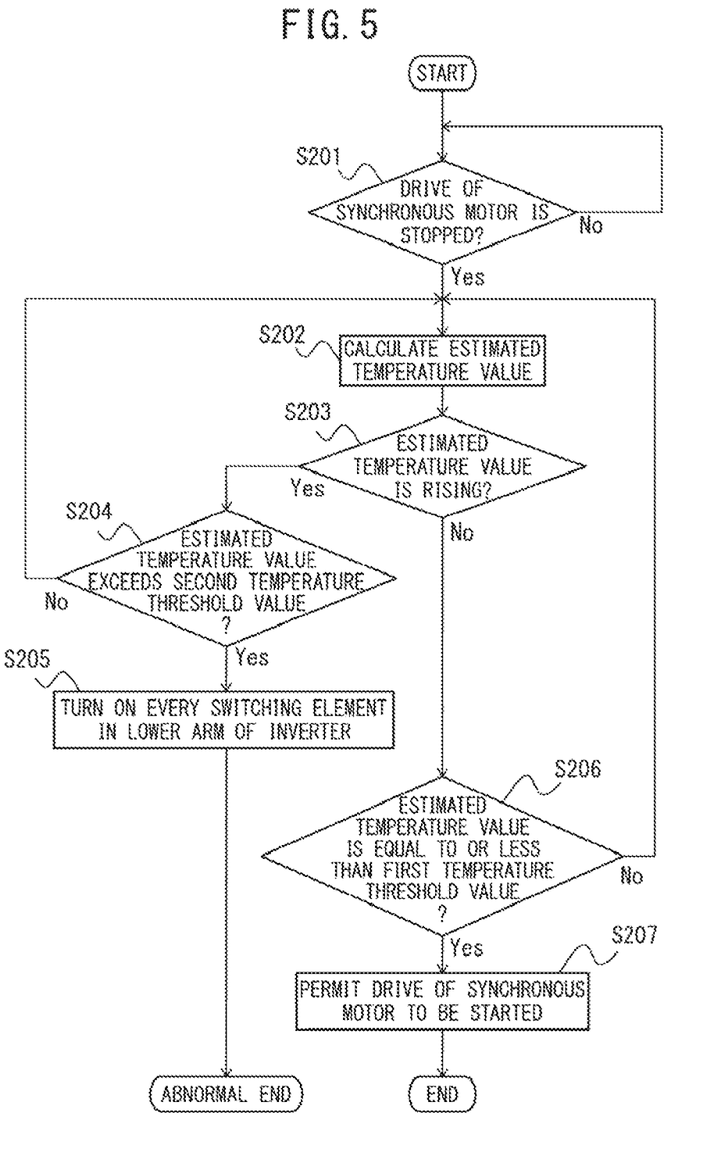
FIG. 5 is a flowchart illustrating an operation flow of a fifth modified example of the motor drive device according to the embodiment of the present disclosure.

FIG. 5 is a flowchart illustrating an operation flow of the fifth modified example of the motor drive device according to the embodiment of the present disclosure.

When the drive of the synchronous motor 2 stops and back electromotive force is generated in a case of the synchronous motor 2 having unexpectedly high inertia, a time period in which short-circuit current flows through the semiconductor switch 103 becomes unexpectedly long, and the semiconductor switch 103 may be damaged due to a temperature rise of the semiconductor switch 103 exceeding an allowable value of the semiconductor switch 103 by continued accumulation of heat in the semiconductor switch 103. Therefore, when a rising estimated temperature value of the semiconductor switch calculated by the temperature estimation unit 13 exceeds a second temperature threshold value, the fifth modified example causes the short-circuit current to also flow through a switching element in an on-state in the inverter 101 in the motor drive circuit 11 in addition to the overvoltage protection circuit 12 by turning on all of the positive-side switching elements $SU_U$, $SV_U$, and $SW_U$ provided in the upper arm of a bridge circuit in the inverter 101 in the motor drive circuit 11 or all of the negative-side switching elements $SU_L$, $SV_L$, and $SW_L$ provided in the lower arm. Thus, energy based on the back electromotive force is consumed in the inverter 101 in the motor drive circuit 11 through the diode rectifier circuit 102 and the semiconductor switch 103 in the overvoltage protection circuit 12, and therefore, the time period during which short-circuit current flows through the semiconductor switch 103 can be shortened, and a temperature rise of the semiconductor switch 103 can be suppressed.

It should be noted that the second temperature threshold value has only to be set at a temperature lower than the heat-resistant temperature of the semiconductor switch 103 and, for example, may be set with reference to a heat-resistant temperature defined in a specification table, an instruction manual, or the like of the semiconductor switch 103. It should be noted that the second temperature threshold value may be stored in a rewritable storage unit (unillustrated) and be rewritable by external equipment, and the second temperature threshold value may be changed to a suitable value as needed even after once being set.

In a state of driving the synchronous motor 2 at a certain number of revolutions by the motor drive device 1, the motor control unit 10 determines whether or not the drive of the synchronous motor 2 is stopped in step S201 described in FIG. 5. When the drive of the synchronous motor 2 is stopped due to a cause such as an out-of-control state of the motor drive device 1 or an emergency stop by the motor drive device 1, the synchronous motor 2 decelerates, and back electromotive force is generated. For example, when receiving an alarm indicating that the motor drive device 1 has fallen into an out-of-control state or when receiving an emergency stop signal to the motor drive device 1, the motor control unit 10 determines that the drive of the synchronous motor 2 is stopped. Alternatively, the motor control unit 10 may determine that the drive of the synchronous motor 2 is stopped when the line voltage of the power line connecting the motor drive circuit 11 to the synchronous motor 2 exceeds a predetermined voltage. When determining that the drive of the synchronous motor 2 is stopped in step S201, the motor control unit 10 commands the semiconductor switch 103 in the overvoltage protection circuit 12 to turn on, and thus a short circuit between the terminals of the diode rectifier circuit 102 on the DC, output side is established, and the processing advances to step S202.

In step S202, the temperature estimation unit 13 calculates an estimated temperature value of the semiconductor switch 103 by using a motor constant including at least one item out of inertia and a back electromotive force constant that are related to the synchronous motor 2, and semiconductor switch constants including on-resistance, thermal resistance, and a thermal time constant that are related to the semiconductor switch 103. It should be noted that when an estimated temperature value of the semiconductor switch 103 is calculated by using a value detected by the speed sensor 23, the value of the inertia is not necessary in calculation of the estimated temperature value by the temperature estimation unit 13 in step S202. When the semiconductor switch 103 is turned on, the synchronous motor 2 gradually decelerates, short-circuit current continues to flow through the semiconductor switch 103 until the synchronous motor 2 completely stops (i.e., until rotation energy of the synchronous motor 2 becomes zero), and the estimated temperature value of the semiconductor switch 103 calculated by the temperature estimation unit 13 rises. After the estimated temperature value of the semiconductor switch 103 reaches a maximum temperature, the estimated temperature value of the semiconductor switch 103 calculated by the temperature estimation unit 13 falls. The processing in step S202 and step S203 is repeatedly executed until the estimated temperature value rises to the maximum temperature, and calculation of the estimated temperature value by the temperature estimation unit 13 continues.

In step S203, the motor control unit 10 determines whether or not the estimated temperature value calculated by the temperature estimation unit 13 is rising. Since the estimated temperature value continues to rise in a period after the semiconductor switch 103 is turned on until the estimated temperature value of the semiconductor switch 103 reaches the maximum temperature, the estimated temperature value is determined to be rising in step S203 in the period after the semiconductor switch 103 is turned on until the estimated temperature value of the semiconductor switch 103 reaches the maximum temperature, and the processing advances to step S204. Since the estimated temperature value of the semiconductor switch 103 falls after the estimated temperature value reaches the maximum temperature, the estimated temperature value is determined to be not rising in step S203, and the processing advances to step S206.

In step S204, the motor control unit 10 determines whether or not the rising estimated temperature value of the semiconductor switch calculated by the temperature estimation unit 13 exceeds the second temperature threshold value. The processing advances to step S205 when the estimated temperature value is determined to exceed the second temperature threshold value and returns to step S202 when the estimated temperature value is not determined to exceed the second temperature threshold value.

In step S205, the motor control unit 10 controls the inverter 101 in the motor drive circuit 11 in such a way that all of the negative-side switching elements $SU_L$, $SV_L$, and $SW_L$ provided in the lower arm of the bridge circuit in the inverter 101 in the motor drive circuit 11 are turned on. Thus, short-circuit current flows through switching elements being turned on in the inverter 101 in the motor drive circuit 11 in addition to through the overvoltage protection circuit 12. It should be noted that the motor control unit 10 may control the inverter 101 in the motor drive circuit 11 in such a way that all of the positive-side switching elements $SU_U$, $SV_U$, and $SW_U$ provided in the upper arm of the bridge circuit in the inverter 101 in the motor drive circuit 11 are turned on in step 205. When step S205 is executed, current flows through both the overvoltage protection circuit 12 and the motor drive circuit 11, which hinders accurate calculation of the estimated temperature value of the semiconductor switch 103; and therefore, abnormality processing such as alarm output is executed and the processing is ended.

In step S206, the permission signal output unit 14 determines whether or not the falling estimated temperature value of the semiconductor switch 103 calculated by the temperature estimation unit 13 falls below the first temperature threshold value. The estimated temperature value gradually falls over time after reaching the maximum temperature and falls below the first temperature threshold value at a certain point in time. The processing advances to step S207 at a point in time when the permission signal output unit 14 determines that the falling estimated temperature value of the semiconductor switch 103 calculated by the temperature estimation unit 13 falls below the first temperature threshold value. It should be noted that the temperature falls with a certain time constant after the estimated temperature value reaches the maximum temperature, and therefore, the time required for the estimated temperature value to fall below the first temperature threshold value after reaching the maximum temperature can be predictively calculated. Therefore, the temperature estimation unit 13 continuously executes calculation of the estimated temperature value in the period after the semiconductor switch 103 is turned on until the estimated temperature value rises to the maximum temperature, and predictively calculates, as a "drive standby time," a time period with a point in time when the estimated temperature value reaches the maximum temperature as a starting point and a point in time when the estimated temperature value falls below the first temperature threshold value as an ending point after the estimated temperature reaches the maximum temperature; and the permission signal output unit 14 determines a point in time when the drive standby time elapses after the estimated temperature value reaches the maximum temperature to be a point in time when the falling estimated temperature value of the semiconductor switch 103 calculated by the temperature estimation unit 13 falls below the first temperature threshold value.

In step S207, the permission signal output unit 14 outputs a signal permitting drive of the synchronous motor 2 to be started by the motor drive circuit 11 to the motor control unit 10. Thus, the motor control unit 10 enters a standby state in such a way as to be able to restart drive control of the synchronous motor 2 any time. An operator preferably performs preparation work for redrive of the synchronous motor 2 such as, when the cause of the stop of drive of the synchronous motor 2 in step S201 is, for example, an out-of-control state of the motor drive device 1, performing work for removing the cause of the out-of-control state and when the cause of the stop of drive of the synchronous motor 2 is, for example, an emergency stop by the motor drive device 1, performing work for removing the cause of the emergency stop. After the overvoltage protection circuit 12 is started and the semiconductor switch 103 is turned on, the motor control unit 10 cannot perform drive control of the synchronous motor 2 unless the drive of the synchronous motor 2 by the motor drive circuit 11 is permitted to be started by the permission signal output unit 14 in step S206, and therefore, safety of the motor drive device 1 can be secured. Actual drive of the synchronous motor 2 is performed upon removal of the cause of the stop of drive of the synchronous motor 2 by the operator after the drive of the synchronous motor 2 by the motor drive circuit 11 is permitted to be started by the permission signal output unit 14 in step S207.

Figure 6:
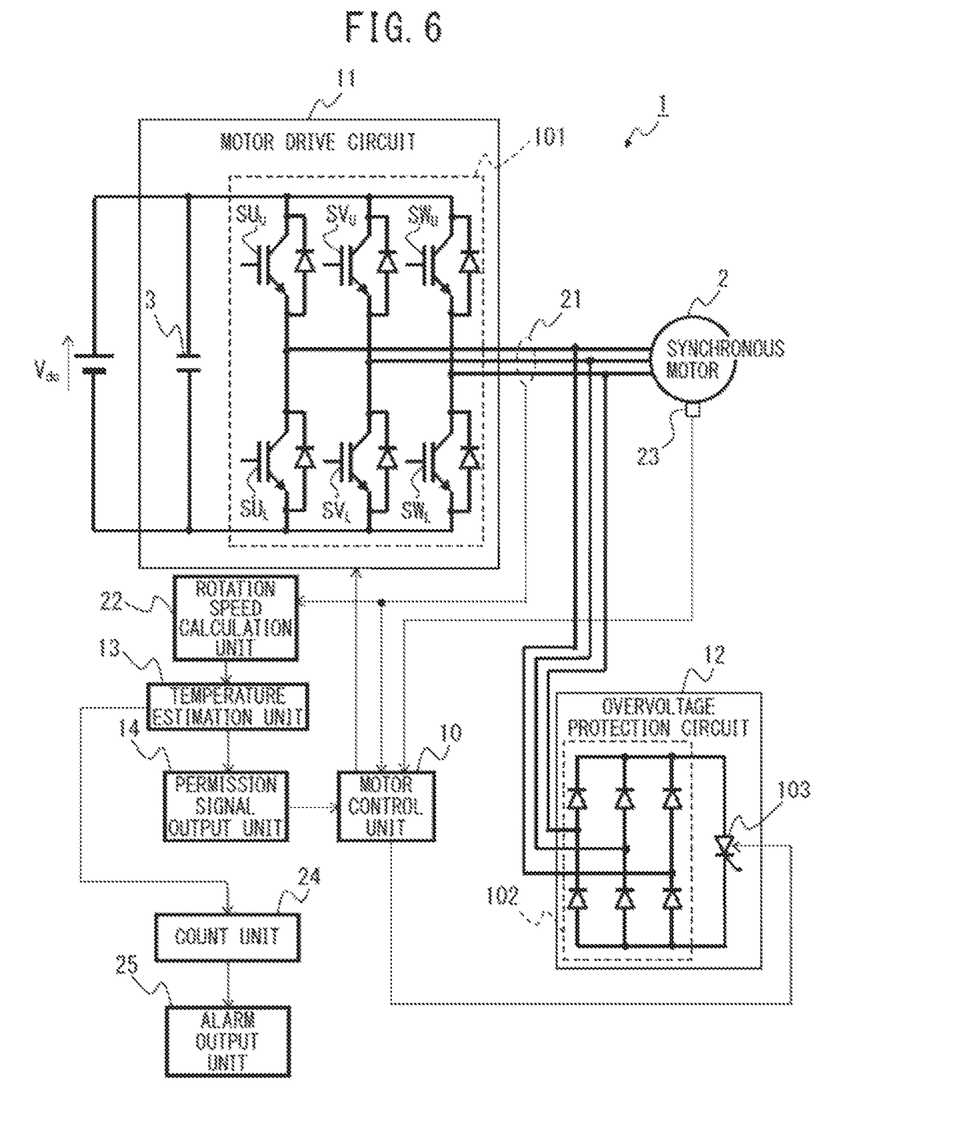
FIG. 6 is a diagram illustrating a sixth modified example of the motor drive device according to the embodiment of the present disclosure.

A sixth modified example according to the embodiment of the present disclosure counts the number of temperature changes particularly putting burdens on the semiconductor switch 103 out of temperature changes including rises and falls of the temperature of the semiconductor switch 103 and utilizes the counting in preventive maintenance by outputting an alarm when the count exceeds a predetermined count threshold value in consideration of possible damage to the semiconductor switch 103.

FIG. 6 is a diagram illustrating the sixth modified example of the motor drive device according to the embodiment of the present disclosure.

In general, when considerable temperature changes are repeated, stresses occur between members with different thermal contraction rates in the semiconductor switch 103, which shortens the life of the semiconductor switch 103. As described above, the estimated temperature value of the semiconductor switch 103 gradually rises when the semiconductor switch 103 is turned on and gradually decreases after reaching a maximum temperature. For example, when the rotation speed of the synchronous motor 2 at a point in time when the semiconductor switch 103 is turned on is low, the maximum temperature of the estimated temperature value of the semiconductor switch 103 is low, which does not put a burden on the semiconductor switch 103; however, when the rotation speed of the synchronous motor 2 at the point in time when the semiconductor switch 103 is turned on is high, the maximum temperature of the estimated temperature value of the semiconductor switch 103 is high, which puts a burden on the semiconductor switch 103. Therefore, the sixth modified example extracts and counts temperature changes particularly putting burdens on the semiconductor switch 103 out of temperature changes including rises and falls of the temperature of the semiconductor switch 103 by comparing the estimated temperature value calculated by the temperature estimation unit 13 with a third temperature threshold value and outputs an alarm when the count exceeds a predetermined count threshold value in consideration of possible damage to the semiconductor switch 103.

It should be noted that the third temperature threshold value has only to be set at a temperature lower than the heat-resistant temperature of the semiconductor switch 103 and, for example, may be set with reference to a heat-resistant temperature defined in a specification table, an instruction manual, or the like of the semiconductor switch 103. It should be noted that the third temperature threshold value may be stored in a rewritable storage unit (unillustrated) and be rewritable by external equipment, and the third temperature threshold value may be changed to a suitable value as needed even after once being set.

For example, the count threshold value may be set to a value smaller than a serviceable switching count of the semiconductor switch 103 defined in a specification table, an instruction manual, or the like of the semiconductor switch 103 on the assumption that very high short-circuit current flows through the semiconductor switch 103. It should be noted that the count threshold value may be stored in a rewritable storage unit (unillustrated) and be rewritable by external equipment, and the count threshold value may be changed to a suitable value as needed even after once being set.

As illustrated in FIG. 6, the motor drive device 1 further includes a count unit 24 and an alarm output unit 25 in addition to the configuration of the motor drive device 1 described with reference to FIG. 1 or FIG. 4.

The count unit 24 counts the number of times the rising estimated temperature value of the semiconductor switch 103 calculated by the temperature estimation unit 13 exceeds the third temperature threshold value. Since the rise/fall count of temperature of the semiconductor switch 103 in one operation by the overvoltage protection circuit 12 is one, the number of times the estimated temperature value of the semiconductor switch 103 exceeds the third temperature threshold value in one operation of the overvoltage protection circuit 12 does not exceed one. In other words, the number of times the estimated temperature value of the semiconductor switch 103 exceeds the third temperature threshold value is always equal to or less than the operation count of the overvoltage protection circuit 12.

The alarm output unit 25 outputs an alarm when the number counted by the count unit 24 exceeds a predetermined count threshold value. The alarm output from the alarm output unit 25 is sent to a display unit (unillustrated), and the display unit performs display prompting replacement of the semiconductor switch 103. Examples of the display unit include a standalone display device, a display device attached to the motor drive device 1, a display device attached to a higher level control device (unillustrated), display devices attached to a personal computer and a mobile terminal, and light-emitting equipment such as an LED and a lamp. For example, when the display unit is configured with light-emitting equipment such as an LED or a lamp, the light-emitting equipment prompts an operator to replace the semiconductor switch 103 by emitting light upon receipt of an alarm. Further, for example, an alarm output from the alarm output unit is sent to audio equipment (unillustrated), and the audio equipment prompts an operator to replace the semiconductor switch 103 by producing a sound such as a voice, a speaker, a buzzer, and a chime upon receipt of an alarm. Thus, the operator can reliably and easily recognize degradation of the semiconductor switch 103 and can easily take measures such as replacement of the semiconductor switch 103.

With regard to an estimated temperature value calculated by the temperature estimation unit 13 according to the embodiment of the present disclosure and the modified examples thereof that are described above, for example, calibration may be performed as appropriate on the calculation processing by the temperature estimation unit 13 by installing a temperature sensor close to the semiconductor switch 103 and measuring the actual temperature of the semiconductor switch 103. When the estimated temperature value calculated by the temperature estimation unit 13 differs considerably from the actual temperature of the semiconductor switch 103 measured by the temperature sensor, a failure may be determined to exist in an arithmetic processing unit including the temperature estimation unit 13, and in that case, measures such as replacement of the arithmetic processing unit can be taken.

For example, the motor control unit 10, the temperature estimation unit 13, the permission signal output unit 14, the count unit 24, and the alarm output unit 25 may be constructed in a software program form, may be constructed by a combination of various electronic circuits and a software program, or may be configured only with various electronic circuits. For example, when the units are constructed in a software program form, the functions of the aforementioned units can be provided by causing an arithmetic processing unit such as a DSP or an FPGA to operate in accordance with the software program. Alternatively, the motor control unit 10, the temperature estimation unit 13, the permission signal output unit 14, the count unit 24, and the alarm output unit 25 may be provided as a semiconductor integrated circuit in which a software program providing the functions of the units is written. Alternatively, the motor control unit 10, the temperature estimation unit 13, the permission signal output unit 14, the count unit 24, and the alarm output unit 25 may be provided as a recording medium on which a software program providing the functions of the units is written. Further, for example, the motor control unit 10, the temperature estimation unit 13, the permission signal output unit 14, the count unit 24, and the alarm output unit 25 may be provided in a numeric controller of a machine tool or may be provided in a robot controller controlling a robot.

The motor control unit 10, the temperature estimation unit 13, the permission signal output unit 14, the count unit 24, and the alarm output unit 25 may be configured with a combination of an analog circuit and a digital circuit, may be provided by an arithmetic processing unit constructed in a software program form, or may be configured only with an analog circuit. It should be noted that the current sensor 21 and the speed sensor 23 generally provided in the motor drive device 1 may be diverted.

Further, for example, the storage unit storing the first temperature threshold value, the second temperature threshold value, the third temperature threshold value, and the count threshold value may be configured with an electrically-erasable/recordable nonvolatile memory such as an EEPROM (registered trademark) or a random-access memory capable of high-speed read/write such as a DRAM or an SRAM.

REFERENCE SIGNS LIST

1 Motor drive device
2 Synchronous motor
3 Smoothing capacitor
10 Motor control unit
11 Motor drive circuit
12 Overvoltage protection circuit
13 Temperature estimation unit
14 Permission signal output unit
21 Current sensor
22 Rotation speed calculation unit
23 Speed sensor
24 Count unit
25 Alarm output unit
101 Inverter
102 Diode rectifier circuit
103 Semiconductor switch

The invention claimed is:
1. A motor drive device comprising:
a motor drive circuit configured to drive a synchronous motor by supplying AC power to the synchronous motor through a power line;
an overvoltage protection circuit being provided between the synchronous motor and the motor drive circuit and, configured to short-circuit between phases of the power line by turning on a semiconductor switch when drive of the synchronous motor by the motor drive circuit is stopped to prevent generation of overvoltage due to back electromotive force between terminals of the synchronous motor, and
a temperature estimation unit configured to calculate an estimated temperature value of the semiconductor switch that rises and then falls by turning on the semiconductor switch, by using a motor constant including at least one item out of inertia and a back electromotive force constant that are related to the synchronous motor, and semiconductor switch constants including on-resistance, thermal resistance, and a thermal time constant that are related to the semiconductor switch.

2. The motor drive device according to claim 1, further comprising a permission signal output unit configured to output a signal permitting drive of the synchronous motor to be started by the motor drive circuit when the falling estimated temperature value of the semiconductor switch calculated by the temperature estimation unit falls below a first temperature threshold value.

3. The motor drive device according to claim 1, further comprising:
   a current sensor configured to detect a value of current flowing through the power line; and
   a rotation speed calculation unit configured to calculate rotation speed of the synchronous motor, based on a value of current detected by the current sensor, wherein
   the temperature estimation unit calculates the estimated temperature value of the semiconductor switch by using the motor constant, the semiconductor switch constants, and rotation speed of the synchronous motor calculated by the rotation speed calculation unit.

4. The motor drive device according to claim 1, further comprising
   a speed sensor configured to detect rotation speed of the synchronous motor, wherein
   the temperature estimation unit calculates the estimated temperature value of the semiconductor switch by using the motor constant, the semiconductor switch constants, and the rotation speed of the synchronous motor detected by the speed sensor.

5. The motor drive device according to any one of claim 1, wherein
   every positive-side switching element provided in an upper arm of or every negative-side switching element provided in a lower arm of a bridge circuit in an inverter in the motor drive circuit is turned on when the rising estimated temperature value of the semiconductor switch calculated by the temperature estimation unit exceeds a second temperature threshold value.

6. The motor drive device according to any one of claim 1, further comprising:
   a count unit configured to count a number of times the rising estimated temperature value of the semiconductor switch calculated by the temperature estimation unit exceeds a third temperature threshold value; and
   an alarm output unit configured to output an alarm when a number counted by the count unit exceeds a predetermined count threshold value.

7. The motor drive device according to any one of claim 1, wherein the overvoltage protection circuit includes a diode rectifier circuit including an AC terminal connected to the power line and a DC terminal connected to the semiconductor switch.

* * * * *